United States Patent
Mosher (10) Patent No.: US 7,265,679 B2
(45) Date of Patent: Sep. 4, 2007

(54) APPARATUS AND METHOD FOR INDICATING ONSET OF HIGH-VOLTAGE AT AN OUTPUT LOCUS OF A SIGNAL CONVERTER DEVICE

(75) Inventor: Norman B. Mosher, Raleigh, NC (US)

(73) Assignee: Texas Instruments Incorporated, Dallas, TX (US)

( * ) Notice: Subject to any disclaimer, the term of this patent is extended or adjusted under 35 U.S.C. 154(b) by 170 days.

(21) Appl. No.: 11/070,546

(22) Filed: Mar. 2, 2005

(65) Prior Publication Data
US 2006/0208919 A1  Sep. 21, 2006

(51) Int. Cl.
*G08B 21/00* (2006.01)

(52) U.S. Cl. ............ 340/662; 340/660; 340/661; 340/663; 340/539.21; 340/593; 323/209; 323/222; 323/282; 323/288

(58) Field of Classification Search ............... 340/662, 340/660, 661, 663, 539.21, 593; 323/222, 323/209, 282, 288
See application file for complete search history.

(56) References Cited

U.S. PATENT DOCUMENTS 5,808,883 A * 9/1998 Hawkes .................. 363/60
6,583,610 B2 * 6/2003 Groom et al. ............ 323/288
7,034,586 B2 * 4/2006 Mehas et al. ............ 327/143

* cited by examiner

*Primary Examiner*—Tai Nguyen
(74) *Attorney, Agent, or Firm*—Wade J. Brady, III; Frederick J. Telecky, Jr.

(57) ABSTRACT

An apparatus for indicating detection of an onset of a high-voltage condition at an output locus of a signal converter device, the signal converter device including a switching network for switchingly controlling a potential at a circuit node coupled with the output locus in response to a control signal received from a control signal source, includes: (a) a first sensing unit coupled for sensing a parameter at the circuit node; (b) a second sensing unit coupled for sensing the control signal; and (c) a comparing device coupled with the first sensing unit and with the second sensing unit; the comparing device effecting comparison of a first signal from the first sensing unit with a second signal from the second sensing unit. The comparing device effects the detection when the first and second signals have a predetermined relationship, then the apparatus effects the indicating.

14 Claims, 5 Drawing Sheets

APPARATUS AND METHOD FOR INDICATING ONSET OF HIGH-VOLTAGE AT AN OUTPUT LOCUS OF A SIGNAL CONVERTER DEVICE

BACKGROUND OF THE INVENTION

The present invention is directed to signal converter circuits such as voltage converter circuits. By way of example and not by way of limitation, an exemplary signal converter circuit will be described that employs a first upper switch to periodically couple a circuit node with a supply voltage, and employs a second lower switch to periodically couple the circuit node with a lower potential than the supply voltage. Sometimes the lower potential is at ground potential. In such circuits the output signal is presented from the circuit node via a delaying circuit, usually embodied in a filtering circuit.

In a fault condition where one of the switches fails in a closed orientation the output signal achieve an over-voltage condition at which output potential can damage connected equipment. If one could predict the onset of an over-voltage condition, measures may be timely taken to prevent damage to connected equipment.

There is a need for an apparatus and method for indicating onset of a high-voltage at an output locus of a pulsed signal supply.

SUMMARY OF THE INVENTION

An apparatus for indicating detection of an onset of a high-voltage condition at an output locus of a signal converter device, the signal converter device including a switching network for switchingly controlling a potential at a circuit node coupled with the output locus in response to a control signal received from a control signal source, includes: (a) a first sensing unit coupled for sensing a parameter at the circuit node; (b) a second sensing unit coupled for sensing the control signal; and (c) a comparing device coupled with the first sensing unit and with the second sensing unit; the comparing device effecting comparison of a first signal from the first sensing unit with a second signal from the second sensing unit. The comparing device effects the detection when the first and second signals have a predetermined relationship, then the apparatus effects the indicating.

It is, therefore, an object of the present invention to provide an apparatus and method for indicating onset of a high-voltage at an output locus of a signal converter circuit.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
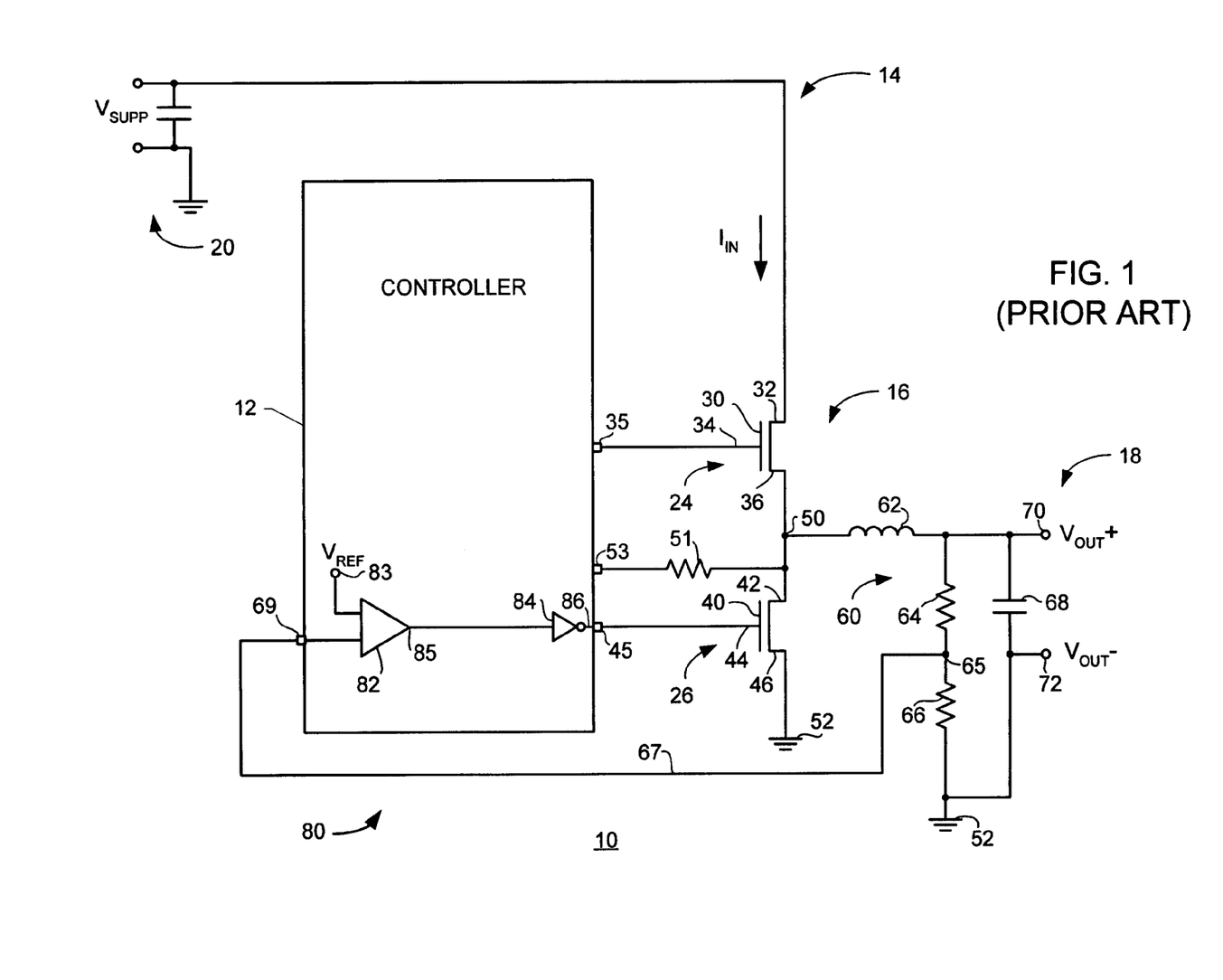
FIG. 1 is an electrical schematic diagram of a prior art signal converter device.

FIG. 1 is an electrical schematic diagram of a prior art signal converter device. In FIG. 1, a signal converter device 10 is configured as a DC-to-DC converter device and includes a controller unit 12, an input section 14, a switching section 16 and an output section 18. Input section 14 receives an input signal at an input locus 20 having an input potential $V_{SUPP}$. Input locus 20 is coupled with switching section 16 to deliver an input current $I_{IN}$ at a potential $V_{SUPP}$ for delivery to switching section 16.

Switching section 16 includes a first or upper switch 24 and a second or lower switch 26. Upper switch 24 is configured as an NMOS transistor 30 having a drain 32, a gate 34 and a source 36. Lower switch 26 is configured as an NMOS transistor 40 having a drain 42, a gate 44 and a source 46. Drain 32 is coupled with input current generator 22, gate 34 is coupled with controller unit 12 and source 36 is coupled with a circuit node 50. Drain 42 is coupled with circuit node 50, gate 44 is coupled with controller unit 12 and source 46 is coupled with a ground locus 52. Gate 34 is provided a gating signal from an input-output (IO) pin 35 of controller unit 12. Gate 44 is provided a gating signal from an IO pin 45 of controller unit 12. Controller unit 12 provides gating signals to NMOS transistors 30, 40 to control potential at circuit node 50.

Output section 18 includes a filter unit 60 coupled between circuit node 50 and output loci 70, 72. Filter unit 60 includes in an inductor 62 coupled between circuit node 50 and output locus 70, resistors 64, 66 coupled between output locus 70 and ground 52. A capacitor 68 is coupled between output loci 70, 72. Output locus 72 is coupled with ground locus 52. Potential extant at circuit locus 50 is available to controller unit 12 via a resistor 51 and an IO pin 53.

A feedback section 80 is coupled between a node 65 between resistors 64, 66 and gate 44 of NMOS transistor 40. Feedback section 80 includes a comparing unit 82 and an inverter unit 84. Comparing unit 82 and inverter unit 84 may be located within controller unit 12 (as illustrated in FIG. 1) or located outside of controller unit 12. When comparing unit 82 and inverter unit 84 are located within controller unit 12, comparing unit 82 receives signals from node 65 via a line 67 and an IO pin 69. Comparing unit 82 compares signals from node 65 with a reference signal $V_{REF}$ received from a reference locus 83. When the signal from node 65 and reference signal $V_{REF}$ have a predetermined relationship, an output signal is presented at an output locus 85 of comparing unit 82 for inverter unit 84. Inverter unit 84 presents an output signal at an inverter output locus 86 that in inverted with respect to the signal presented at comparing unit output locus 85. Signals appearing at inverter output locus 86 are applied as gating signals at gate 44 of NMOS transistor 40.

As electronic systems become more complex and more costly, power system converter system faults become increasingly important to mitigate. If NMOS transistor 30 fails so that potential $V_{SUPP}$ is provided uninterruptedly to circuit node 50, then output signals at output loci 70, 72 will rise above a desired regulated voltage level toward potential $V_{SUPP}$. If no remedial action is timely taken, equipment coupled with output loci 70, 72 will likely be severely and irreparably damaged.

Feedback section 80 monitors potential level near output loci 70, 72. Reference voltage $V_{REF}$ is selected so that comparing unit 82 and inverter unit 84 cooperate to render NMOS 40 conductive when voltage at output loci 70, 72 get too high. When NMOS 40 conducts, circuit node 50 is coupled with ground locus 52, thereby lowering potential provided to output section 16 and lowering too-high potential of signals at output loci 70, 72.

A problem with the configuration of signal converter device 10 is that potential sensed at node 65 in output section 16 is essentially contemporaneously appearing at output loci 70, 72. That is, if too-high potential is sensed as appearing at node 65 it is likely already too late for equipment attached with output loci 70, 72 because the equipment thus attached has already been subjected to the potentials sensed. One solution to this dilemma is to select reference voltage $V_{REF}$ to assure that NMOS transistor is rendered conducting at potentials lower than levels dangerous to attached equipment. That essentially amounts to establishing a safety margin for operation of signal converter device 10. However, by disabling signal converter device 10 at output signal potentials lower than are actually adverse to attached equipment, one may unnecessarily limit the operating range of signal converter device 10.

It would be advantageous to be able to anticipate appearance of too-high potential signals at output loci 70, 72 in sufficient time to prevent delivery of the too-high potential signals to equipment attached to output loci 70, 72.

Figure 2:
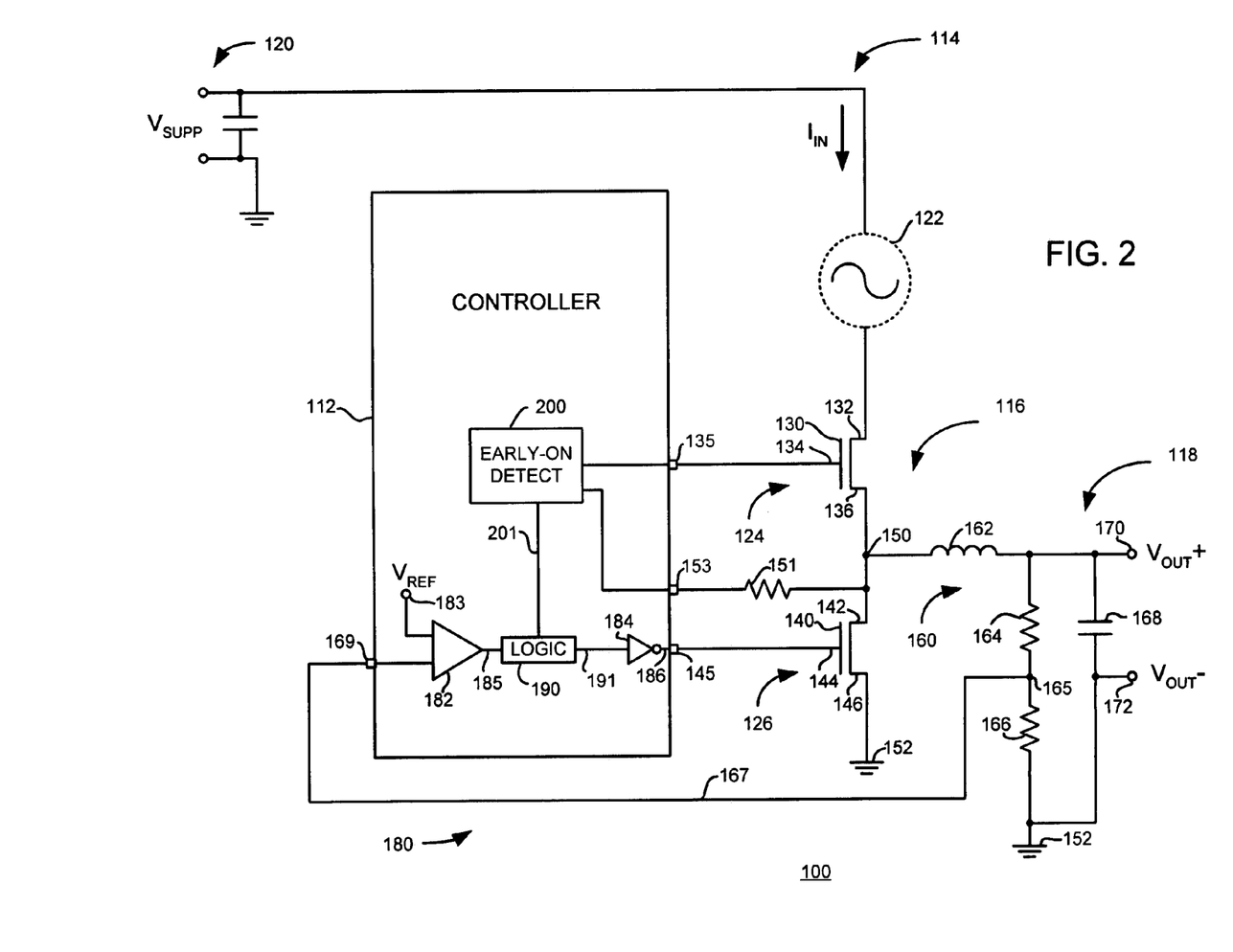
FIG. 2 is an electrical schematic diagram of a signal converter device configured using the apparatus of the present invention.

FIG. 2 is an electrical schematic diagram of a signal converter device configured using the apparatus of the present invention. In FIG. 2, a signal converter device 100 is configured as a DC-to-DC converter device and includes a controller unit 112, an input section 114, a switching section 116 and an output section 118. Input section 114 receives an input signal at an input locus 120 having an input potential $V_{SUPP}$. Input locus 120 is coupled with switching section 116 to deliver an input current $I_{IN}$ at a potential $V_{SUPP}$ to switching section 116 via an optional fuse device 122 (indicated in dotted-line format).

Switching section 116 includes a first or upper switch 124 and a second or lower switch 126. Upper switch 124 is configured as an NMOS transistor 130 having a drain 132, a gate 134 and a source 136. Lower switch 126 is configured as an NMOS transistor 140 having a drain 142, a gate 144 and a source 146. Drain 132 is coupled with input current generator 122, gate 134 is coupled with controller unit 112 and source 136 is coupled with a circuit node 150. Drain 142 is coupled with circuit node 150, gate 144 is coupled with controller unit 112 and source 146 is coupled with a ground locus 152. Gate 134 is provided a gating signal from an input-output (IO) pin 135 of controller unit 112. Gate 144 is provided a gating signal from an IO pin 145 of controller unit 112. Controller unit 112 provides gating signals to NMOS transistors 130, 140 to control potential at circuit node 150.

Output section 118 includes a filter unit 160 coupled between circuit node 150 and output loci 170, 172. Filter unit 160 includes in an inductor 162 coupled between circuit node 150 and output locus 170, resistors 164, 166 coupled between output locus 170 and ground 152. A capacitor 168 is coupled between output locus 170, 172. Output locus 172 is coupled with ground locus 152. Potential extant at circuit locus 150 is available to controller unit 112 via a resistor 151 and an IO pin 153.

A feedback section 180 is coupled between a node 165 between resistors 164, 166 and gate 144 of NMOS transistor 140. Feedback section 180 includes a comparing unit 182 and an inverter unit 184. Comparing unit 182 and inverter unit 184 may be located within controller unit 112 (as illustrated in FIG. 2) or located outside of controller unit 112. When comparing unit 182 and inverter unit 184 are located within controller unit 112, comparing unit 182 receives signals from node 165 via a line 167 and an IO pin 169. Comparing unit 182 compares signals from node 165 with a reference signal $V_{REF}$ received from a reference locus 183. When the signal from node 165 and reference signal $V_{REF}$ have a predetermined relationship, an output signal is presented at a line 185 of comparing unit 182 for a logic unit 190.

An early-on detect unit 200 is coupled with IO pin 135 for receiving gating signals that are applied to gate 134 of NMOS transistor 130. Early-on detect unit is also coupled with IO pin 153 for receiving an indication of potential extant at circuit locus 150. Early-on detect unit 200 compares signals received from IO pins 135, 153 to ascertain when potential at circuit node 150 is rising above a predetermined acceptable limit. Potential at circuit node 150 is manifested at output loci 170, 172, but at an interval of time after the potential appears at circuit locus 150. Inductor 162 imposes a delay upon signals traversing from circuit node 150 to output loci 170, 172. Time remains after detection that potential at circuit node 150 reaches an unacceptable level for remedial action to be effected that will avoid adversely affecting equipment coupled with output loci 170, 172. Early-on detection unit 200 generates an indicator signal at an output line 201 for presentation to logic unit 190. Logic unit 190 evaluates signals received via lines 185, 201 for generating an output signal at an output line 192 for inverter unit 184. Inverter unit 184 presents an output signal at an inverter output locus 186 that in inverted with respect to the signal presented at output line 191. Signals appearing at inverter output locus 186 are applied as gating signals at gate 144 of NMOS transistor 140.

An exemplary embodiment of logic unit 190 is an OR gate. Using an OR gate for logic unit 190 assures that an output signal will be provided to inverter unit 184 in either event sensed by comparing unit 182 and early-on detection unit 200. By such an arrangement, if early detection of rising potential at circuit node 150 occurs or if rising potential at node 165 occurs, NMOS transistor 144 will be rendered conductive and circuit node 150 will be coupled with ground locus 152. Potential at output loci 170, 172 are thereby timely reduced to avoid damaging equipment coupled with output loci 170, 172.

Early-on detect unit 200 detects conditions at circuit node 150, thus monitoring input to output section 118. Filter unit 160 delays appearance at output loci 170, 172 of signals from circuit node 150. As a result, early-on detect unit 200 can predict whether an over-voltage condition will appear at output loci 170, 172. If such an over-voltage condition at output loci 170, 172 is predicted, NMOS transistor 140 is made conductive by a gating signal from IO pin 145 and circuit node 150 is coupled to ground locus 152 and avoid an over-voltage condition at output loci 170, 172. If fuse device 122 is installed, then grounding NMOS transistor 140 to ground locus 152 will blow fuse device 122 and block delivery of potential $V_{SUPP}$ to drain 132 of NMOS transistor 130.

Figure 3:
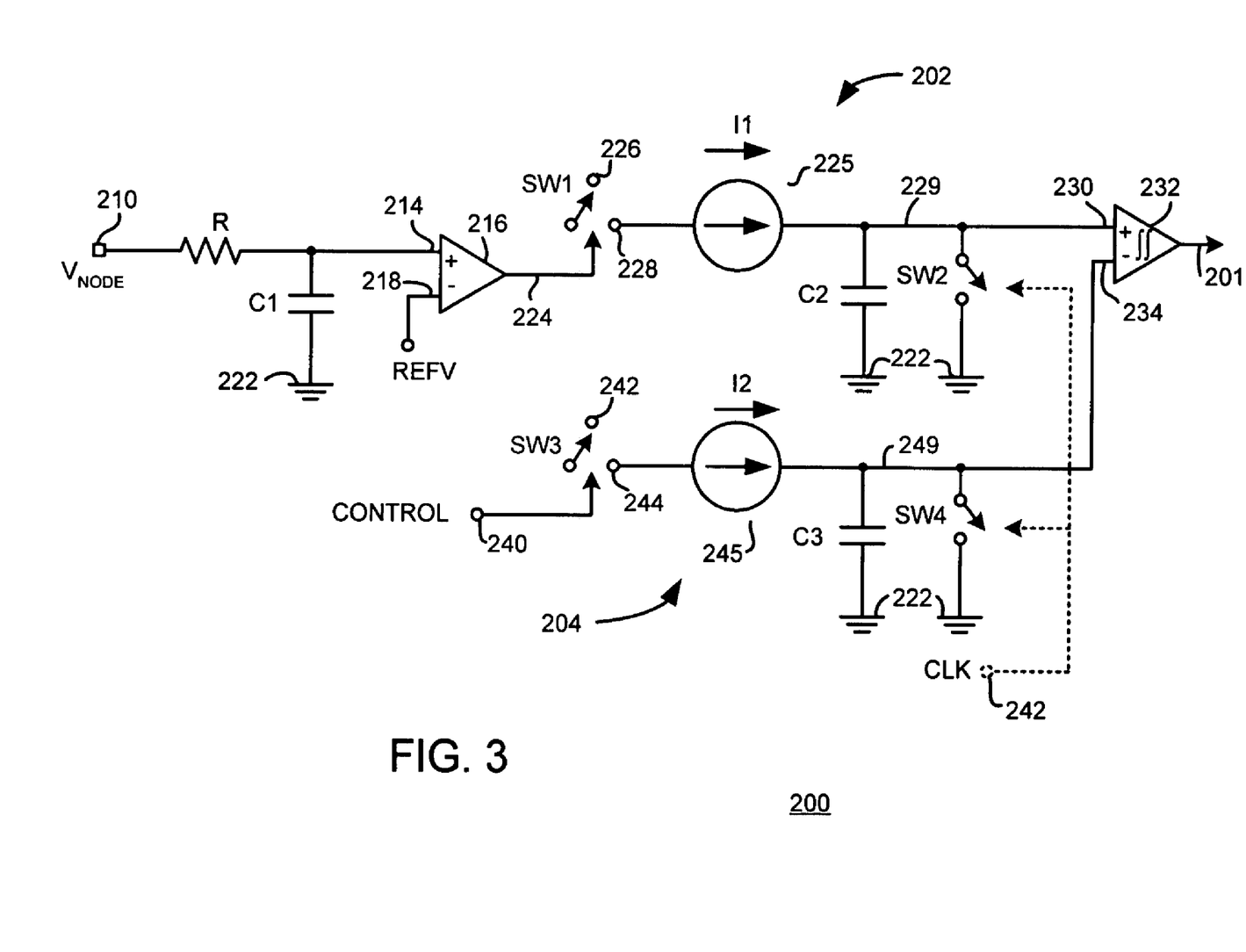
FIG. 3 is an electrical schematic diagram of an early-on detecting circuit used in the signal converter device illustrated in FIG. 2.

FIG. 3 is an electrical schematic diagram of an early on detecting circuit used in the signal converter device illustrated in FIG. 2. In FIG. 3, an early-on detection unit 200

(see FIG. 2) includes a first signal handling network 202 and a second signal handling network 204.

First signal handling network 202 is coupled between an input locus 210 and an output line 201. Input locus 210 may be embodied, by way of example and not by way of limitation, in input-output (IO) pin 153 of control unit 112 and receives an input signal $V_{NODE}$ indicating an extant condition at a circuit node such as potential at circuit node 150 (FIG. 2). First signal handling network 202 also includes a resistor R coupled between input locus 210 and a non-inverting input 214 to a comparing device 216. A reference signal REFV is provided to an inverting input 218 of comparing device 216. A capacitor C1 is coupled between non-inverting input 214 and a ground locus 222. Resistor R and capacitor C1 establish a low pass filter employed to attenuate high frequency ringing that may appear at input locus 210. This low pass filter is not critical to the functioning of early-on detection unit 200.

Comparing device 216 detects when circuit node 150 (FIG. 2) is higher than reference signal REFV. By way of example and not by way of limitation, reference signal REFV may be 0.7 volts.

Comparing device output 224 is configured for actuating a switch device SW1. Switch device SW1 has an open pole 226 and a closed pole 228. Closed pole 228 is coupled with a current source 225. When a signal present at non-inverting input 214 has a particular relationship with reference signal REFV, then a signal is presented at output 224 to actuate switch device SW1 to engage closed pole 228. Actuating switch device SW1 engages current source 225 so that a current $I_1$ is applied via a line 229 to a non-inverting input 230 to a comparing device 232. A capacitor C2 is coupled between line 229 and ground locus 222. A switch device SW2 is also coupled between line 229 and ground locus 222. Switch device SW2 opens and closes in response to a drive signal CLK received at a clock input locus 242.

Second signal handling network 204 is coupled between an input locus 240 and output line 201. Input locus 240 may be embodied, by way of example and not by way of limitation, in IO pin 135 of control unit 112 (FIG. 2). A control signal CONTROL is received at input locus 240 and applied for actuating a switch device SW3. Control signal CONTROL is the commanded on-time for upper NMOS transistor 130 (FIG. 2). The time interval during which a signal at non-inverting input locus 214 of comparing device 216 (representing a signal at circuit node 150; FIG. 2) is higher than reference signal REFV should be of similar duration as the time interval of commanded on-time effected by control signal CONTROL. Switch device SW3 has an open pole 242 and a closed pole 244. Closed pole 244 is coupled with a current source 245. When control signal CONTROL has a particular value switch device SW3 is actuated to engage closed pole 244. Actuating switch device SW3 engages current source 245 so that a current $I_2$ is applied via a line 249 to an inverting input 234 to a comparing device 232. A capacitor C3 is coupled between line 249 and ground locus 222. A switch device SW4 is also coupled between line 249 and ground locus 222. Switch device SW4 opens and closes in response to drive signal CLK received at clock input locus 242.

Currents $I_1$, $I_2$ are preferably proportional to current $I_{IN}$ applied to drain 132 of upper NMOS transistor 130 (FIG. 2). It is also preferred that current $I_1$ be established at about $0.80 \times I_2$. Such an arrangement provides a margin of safety in the operation of early-on detect unit 200 because an over-voltage condition must exist 20% longer than nominal in order to generate a signal at line 201 (FIG. 3) for rendering NMOS transistor 140 conducting.

Capacitors C2, C3 are charged to voltages based upon the time that switches SW1, SW3 are closed and based upon the values of currents $I_1$, $I_2$. Switches SW2, SW4 reset voltage across capacitors C2, C3 at the end of each clock cycle established by clock signal CLK. Comparing device 232 compares voltages across capacitors C2, C3. By this comparison, comparing device 232 effectively measures the time that circuit node 150 (FIG. 2) is high as compared with the commanded on-time established by control signal CONTROL. If voltage across capacitor C2 is greater than voltage across capacitor C3, an over-voltage condition is declared and an output signal is presented at output line 201.

Figure 4:
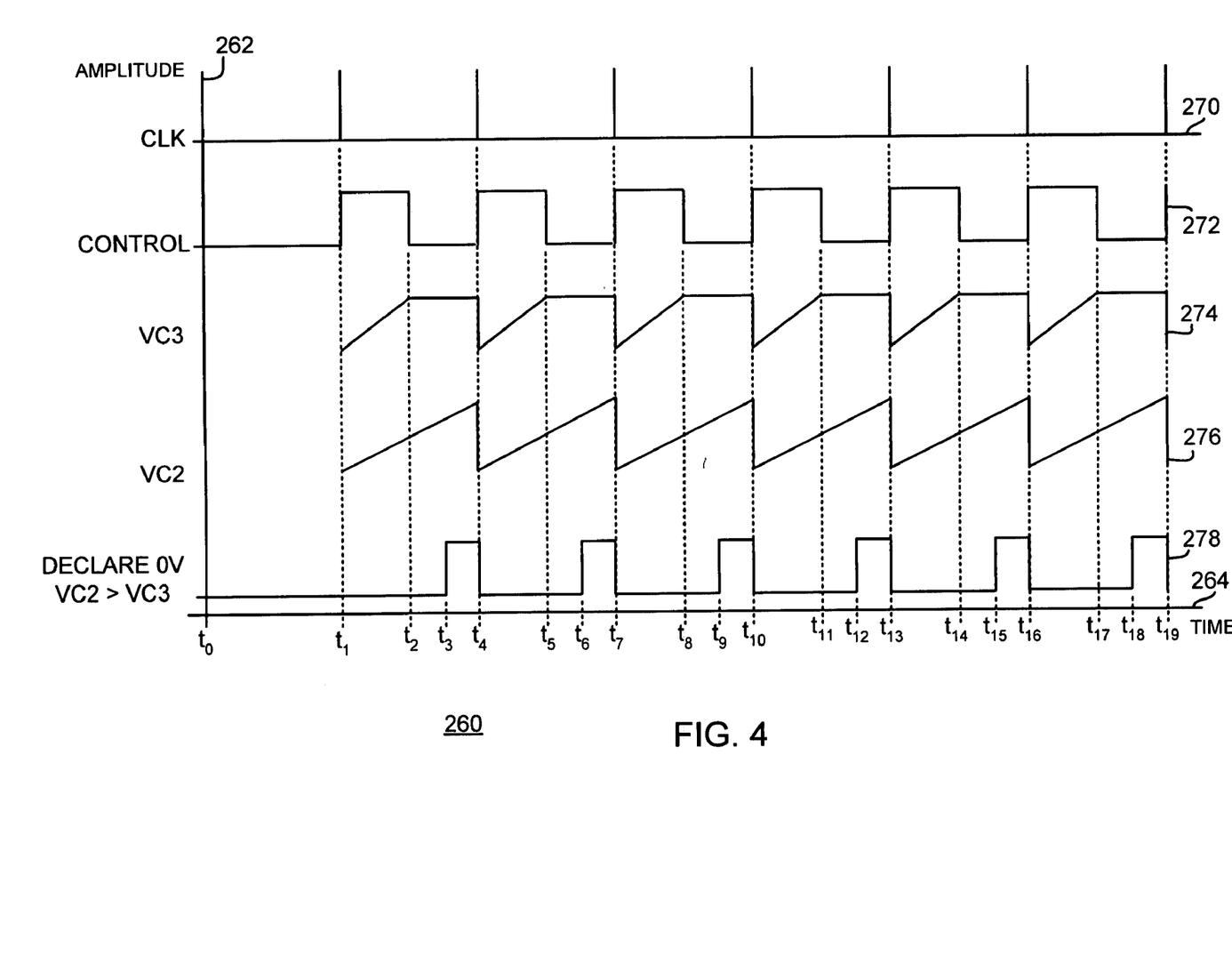
FIG. 4 is a graphic representation of selected signals associated with the operation of the early-on detecting circuit illustrated in FIG. 3 during an over-voltage condition.

FIG. 4 is a graphic representation of selected signals associated with the operation of the early-on detecting circuit illustrated in FIG. 3 during an over-voltage condition. In FIG. 4, signals are represented on a grid 260 with respect to a vertical axis 262 representing signal amplitude and with respect to a horizontal axis 264 representing time. A clock signal CLK is represented by a signal trace 270. A signal CONTROL is represented by a signal trace 272. A signal VC3 is represented by a signal trace 274. A signal VC2 is represented by a signal trace 276. A signal DECLARE 0V VC2>VC3 (hereinafter referred to as signal "DECLARE") is represented by a signal trace 278.

Clock signal CLK appears at input locus 242 (FIG. 3). Signal CONTROL appears at input locus 240 (FIG. 3). Signal VC3 represents voltage across capacitor C3 (FIG. 3). Signal VC2 represents voltage across capacitor C2 (FIG. 3). Signal DECLARE represents signals appearing at output line 201 (FIG. 3).

Considering FIGS. 3 and 4 together, at time $t_1$, clock signal CLK is asserted and switches SW2, SW4 are momentarily closed, thereby resetting voltage across capacitors C2, C3. During the interval $t_1$-$t_2$, a signal is received from circuit node 150 (FIG. 2) at input locus 210 that exceeds reference signal REFV, so a signal is presented at output locus 224 that closes switch SW1. As a consequence of switch SW1 being closed, current $I_1$ flows on line 229 and signal VC2 begins to rise. Also during the interval $t_1$-$t_2$, control signal CONTROL is present at input locus 240 so switch SW3 is closed, current $I_2$ flows on line 249 and signal VC3 begins to rise.

At time $t_2$ control signal CONTROL is terminated at input locus 240 so switch SW3 is opened, current $I_2$ stops flowing on line 249 and signal VC3 ceases rising and remains at a substantially level value. During the interval $t_2$-$t_3$, a signal continues to be received from circuit node 150 (FIG. 2) at input locus 210 that exceeds reference signal REFV. A signal continues to be presented at output locus 224 that closes switch SW1, current $I_1$ continues to flow on line 229 and signal VC2 continues to rise.

At time $t_3$, signal VC2 exceeds signal VC3, so comparing device 232 presents an output signal on output line 201 as indicated by signal DECLARE, thereby indicating an over-voltage condition. At time $t_4$, clock signal CLK is asserted and switches SW2, SW4 are closed, thereby resetting voltage across capacitors C2, C3 to zero. Comparing device 232 ceases presenting signal DECLARE on output line 201.

Events described above during interval $t_1$-$t_4$ are substantially repeated during each subsequent interval $t_4$-$t_7$, $t_7$-$t_{10}$, $t_{10}$-$t_{13}$, $t_{13}$-$t_{16}$ and $t_{16}$-$t_{19}$. In order to avoid prolixity in this description, operation of early-on detect unit 200 during those subsequent intervals will not be separately described.

Figure 5:
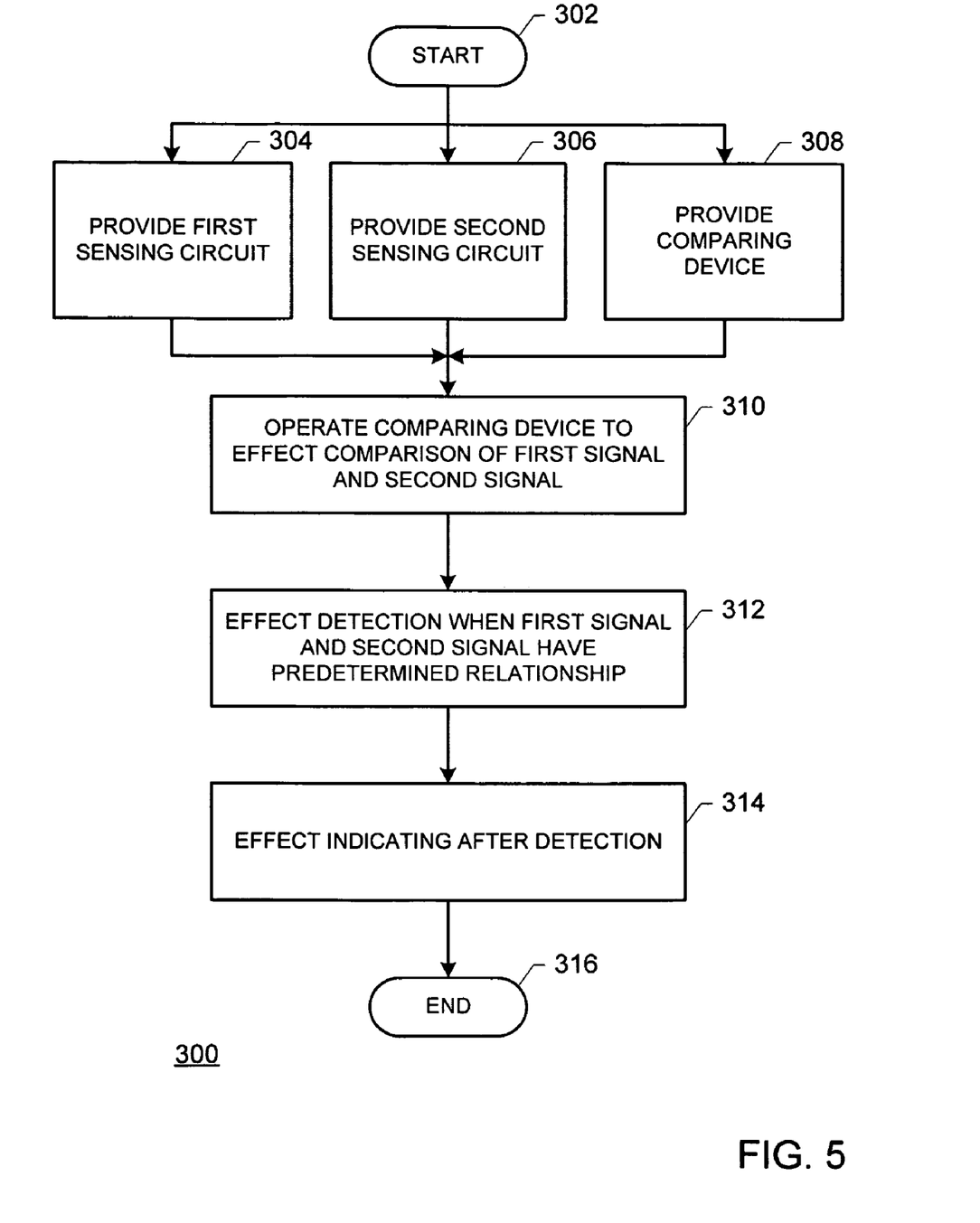
FIG. 5 is a flow chart illustrating the method of the present invention.

FIG. 5 is a flow chart illustrating the method of the present invention. In FIG. 5, a method 300 for indicating detection of an onset of a high-voltage condition at an output locus of a signal converter device begins at a START locus 302. The signal converter device includes a switching network for switchingly controlling a potential at a circuit node coupled with the output locus in response to a control signal received from a control signal source. Method 300 continues with, in no particular order: (1) Providing a first sensing unit coupled for sensing a parameter at the circuit node, as indicated by a block 304. (2) Providing a second sensing unit coupled for sensing the control signal, as indicated by a block 306. (3) Providing a comparing device coupled with the first sensing unit and with the second sensing unit, as indicated by a block 308.

Method 300 continues by operating the comparing device to effect comparison of a first signal received from the first sensing unit with a second signal received from the second sensing unit, as indicated by a block 310. Method 300 continues by effecting the detection when the first signal and the second signal have a predetermined relationship, as indicated by a block 312. Method 300 continues by effecting the indicating after effecting the detection, as indicated by a block 314. Method 300 terminates at an END locus 316.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for effecting an indication of an onset of a high-voltage condition at an output locus of a signal converter device; said signal converter device including a switch device for switchingly coupling an input signal with a circuit node in response to a control signal received from a control signal source, and an output device coupling said circuit node with said output locus; the apparatus comprising:
   (a) a first signal handling network coupled with said circuit node;
   (b) a second signal handling network coupled with said control signal source; and
   (c) a logic device coupled with said first signal handling network and said second signal handling network; said logic device comparing a first network signal received from said first signal handling network with a second network signal received from said second signal handling network; said logic device effecting said indication when said first network signal and said second network signal have a predetermined relationship.

2. An apparatus for effecting an indication of an onset of a high-voltage condition at an output locus of a signal converter device as recited in claim 1 wherein said first network signal indicates substantially extant conditions at said circuit node, and wherein said second network signal indicates desired conditions at said circuit node.

3. An apparatus for effecting an indication of an onset of a high-voltage condition at an output locus of a signal converter device as recited in claim 2 wherein said switch device carries a first current when closed; said first network signal including a first network current and said second network signal including a second network current; said first network current and said second network current being generally proportional to said first current.

4. An apparatus for effecting an indication of an onset of a high-voltage condition at an output locus of a signal converter device as recited in claim 3 wherein said first network current is less than said second network current.

5. An apparatus for effecting an indication of an onset of a high-voltage condition at an output locus of a signal converter device as recited in claim 1 wherein said switch device carries a first current when closed; said first network signal including a first network current and said second network signal including a second network current; said first network current and said second network current being generally proportional to said first current.

6. An apparatus for effecting an indication of an onset of a high-voltage condition at an output locus of a signal converter device as recited in claim 5 wherein said first network current is less than said second network current.

7. An apparatus for indicating detection of an onset of a high-voltage condition at an output locus of a signal converter device; said signal converter device including a switching network for switchingly controlling a potential at a circuit node coupled with said output locus in response to a control signal received from a control signal source; the apparatus comprising:
   (a) a first sensing unit coupled for sensing a parameter at said circuit node;
   (b) a second sensing unit coupled for sensing said control signal; and
   (c) a comparing device coupled with said first sensing unit and with said second sensing unit; said comparing device effecting comparison of a first signal received from said first sensing unit with a second signal received from said second sensing unit; said comparing device effecting said detection when said first signal and said second signal have a predetermined relationship;
   the apparatus effecting said indicating after effecting said detection.

8. An apparatus for indicating detection of an onset of a high-voltage condition at an output locus of a signal converter device as recited in claim 7 wherein said first signal is related with extant conditions at said circuit node and wherein said second signal is related with desired conditions at said circuit node.

9. An apparatus for indicating detection of an onset of a high-voltage condition at an output locus of a signal converter device as recited in claim 8 wherein said comparing said first signal and said second signal are scaled with respect to each other to establish a bias in said comparison; said bias delaying effecting said indicating for a time interval after said detection.

10. An apparatus for indicating detection of an onset of a high-voltage condition at an output locus of a signal converter device as recited in claim 7 wherein said comparing said first signal and said second signal are scaled with respect to each other to establish a bias in said comparison; said bias delaying effecting said indicating for a time interval after said detection.

11. A method for indicating detection of an onset of a high-voltage condition at an output locus of a signal converter device; said signal converter device including a switching network for switchingly controlling a potential at a circuit node coupled with said output locus in response to a control signal received from a control signal source; the method comprising the steps of:
   (a) in no particular order:
       (1) providing a first sensing unit coupled for sensing a parameter at said circuit node;
       (2) providing a second sensing unit coupled for sensing said control signal; and (3) providing a comparing device coupled with said first sensing unit and with said second sensing unit;

(b) operating said comparing device to effect comparison of a first signal received from said first sensing unit with a second signal received from said second sensing unit;

(c) effecting said detection when said first signal and said second signal have a predetermined relationship; and (d) effecting said indicating after effecting said detection.

12. A method for indicating detection of an onset of a high-voltage condition at an output locus of a signal converter device as recited in claim 11 wherein said first signal is related with extant conditions at said circuit node and wherein said second signal is related with desired conditions at said circuit node.

13. A method for indicating detection of an onset of a high-voltage condition at an output locus of a signal converter device as recited in claim 12 wherein said comparing said first signal and said second signal are scaled with respect to each other to establish a bias in said comparison; said bias delaying effecting said indicating for a time interval after said detection.

14. A method for indicating detection of an onset of a high-voltage condition at an output locus of a signal converter device as recited in claim 11 wherein said comparing said first signal and said second signal are scaled with respect to each other to establish a bias in said comparison; said bias delaying effecting said indicating for a time interval after said detection.

* * * * *